(12) United States Patent
Langhammer et al.

(10) Patent No.: US 11,049,377 B2
(45) Date of Patent: Jun. 29, 2021

(54) ALARM DEPENDENT VIDEO SURVEILLANCE

(71) Applicant: IDEMIA Identity & Security Germany AG, Bochum (DE)

(72) Inventors: Stefan Langhammer, Bochum (DE); Norbert Wendt, Essen (DE); Christian Winter, Rheda-Wiedenbrück (DE)

(73) Assignee: IDEMIA Identity & Security Germany AG, Bochum (DE)

( * ) Notice: Subject to any disclaimer, the term of this patent is extended or adjusted under 35 U.S.C. 154(b) by 0 days.

(21) Appl. No.: 16/656,105

(22) Filed: Oct. 17, 2019

(65) Prior Publication Data
US 2020/0126383 A1 Apr. 23, 2020

(30) Foreign Application Priority Data

Oct. 18, 2018 (EP) ..................................... 18201205

(51) Int. Cl.
*G08B 13/196* (2006.01)
*G06K 9/00* (2006.01)
(Continued)

(52) U.S. Cl.
CPC ... *G08B 13/19686* (2013.01); *G06K 9/00771* (2013.01); *G06T 7/20* (2013.01);
(Continued)

(58) Field of Classification Search
None
See application file for complete search history.

(56) References Cited

U.S. PATENT DOCUMENTS 6,509,926 B1 * 1/2003 Mills ................ G08B 13/1968
348/143
6,667,764 B1 * 12/2003 Wakiyama ............. H04N 7/188
348/207.99
(Continued)

FOREIGN PATENT DOCUMENTS

JP 2018/061211 A 4/2018

OTHER PUBLICATIONS

Partial European Search Report issued in corresponding European Patent Application No. 18201205.4, dated Apr. 16, 2019.
(Continued)

*Primary Examiner* — Jayanti K Patel
*Assistant Examiner* — Stefan Gadomski
(74) *Attorney, Agent, or Firm* — Moore & Van Allen PLLC; Henry B. Ward, III

(57) ABSTRACT

The invention provides a method for video surveillance in a video-surveillance system comprising the steps of capturing video images by a video camera observing an area of surveillance; wherein the capturing the video images comprises making objects in the area of surveillance irrecognizable or invisible in captured video images; receiving, by a processor, a predetermined signal; based on the received predetermined signal, generating a first control signal by the processor and transmitting the first control signal to the video camera; receiving the first control signal by the video camera; based on the received first control signal, stopping making objects in the area of surveillance irrecognizable or invisible in the captured video images.

17 Claims, 2 Drawing Sheets

(51) Int. Cl.
*G06T 7/20* (2017.01)
*H04N 7/18* (2006.01)
(52) U.S. Cl.
CPC ............. *H04N 7/181* (2013.01); *H04N 7/188* (2013.01); *G06T 2207/10016* (2013.01); *G06T 2207/30232* (2013.01)

(56) References Cited

U.S. PATENT DOCUMENTS

| | | | | |
|---|---|---|---|---|
| 7,768,546 | B1 * | 8/2010 | Boehringer, Jr. | H04N 7/147 348/143 |
| 8,610,787 | B2 * | 12/2013 | Namba | G02B 7/28 348/142 |
| 2002/0008758 | A1 * | 1/2002 | Broemmelsiek | G08B 13/19686 348/143 |
| 2003/0103139 | A1 * | 6/2003 | Pretzer | H04N 21/2182 348/143 |
| 2005/0018879 | A1 | 1/2005 | Ito et al. | |
| 2005/0129272 | A1 | 6/2005 | Rottman | |
| 2005/0275723 | A1 * | 12/2005 | Sablak | G06T 7/215 348/169 |
| 2006/0158527 | A1 * | 7/2006 | Kang | H04N 5/232 348/211.99 |
| 2006/0280364 | A1 * | 12/2006 | Ma | G06K 9/3233 382/173 |
| 2007/0115356 | A1 | 5/2007 | Kang et al. | |
| 2009/0015670 | A1 * | 1/2009 | Gopinath | H04N 7/18 348/143 |
| 2009/0049484 | A1 * | 2/2009 | Confer | G06T 3/0093 725/86 |
| 2009/0089828 | A1 * | 4/2009 | Carlsgaard | H04N 21/4318 725/28 |
| 2010/0066829 | A1 * | 3/2010 | Mizutani | H04N 5/2624 348/143 |
| 2010/0141767 | A1 * | 6/2010 | Mohanty | G08B 13/19643 348/159 |
| 2010/0149330 | A1 * | 6/2010 | Salgar | G08B 13/19686 348/143 |
| 2010/0205667 | A1 * | 8/2010 | Anderson | G06F 3/017 726/19 |
| 2011/0058036 | A1 * | 3/2011 | Metzger | H04N 7/181 348/143 |
| 2012/0098965 | A1 * | 4/2012 | Barcala | G08B 13/19689 348/143 |
| 2013/0070092 | A1 * | 3/2013 | Miyahara | H04N 5/232 348/143 |
| 2016/0110906 | A1 * | 4/2016 | Ahuja | G06F 3/04817 345/634 |
| 2016/0117798 | A1 * | 4/2016 | Lin | G06T 3/40 345/667 |
| 2016/0219262 | A1 * | 7/2016 | Cole | H04N 13/344 |
| 2016/0328627 | A1 | 11/2016 | Fujii et al. | |
| 2017/0076572 | A1 * | 3/2017 | Rao | H04N 5/91 |
| 2017/0289504 | A1 * | 10/2017 | Fridental | H04N 7/181 |
| 2017/0302719 | A1 * | 10/2017 | Chen | H04L 65/4069 |
| 2018/0129876 | A1 * | 5/2018 | Odinak | G06K 9/46 |
| 2018/0174414 | A1 * | 6/2018 | Edpalm | H04N 19/117 |
| 2018/0211050 | A1 * | 7/2018 | Kumar | G08B 13/196 |
| 2018/0268240 | A1 * | 9/2018 | Loce | G06F 21/6254 |
| 2018/0330591 | A1 * | 11/2018 | Tilkin | G11B 27/34 |
| 2018/0359449 | A1 * | 12/2018 | Matsumoto | G06T 7/254 |
| 2019/0045109 | A1 * | 2/2019 | Takami | H04N 7/183 |
| 2019/0080576 | A1 * | 3/2019 | Cleary | G08B 13/19695 |
| 2019/0114783 | A1 * | 4/2019 | Iwamoto | G06T 1/0007 |
| 2019/0197254 | A1 * | 6/2019 | Salgar | G06K 9/00771 |
| 2019/0377958 | A1 * | 12/2019 | Geiler | G06T 7/215 |

OTHER PUBLICATIONS

Extended European Search Report issued in corresponding European Patent Application No. 18201205.4, dated Jul. 25, 2019.

* cited by examiner

System 10:

ALARM DEPENDENT VIDEO SURVEILLANCE

FIELD OF THE INVENTION

The present invention refers to systems of video surveillance and particularly to a method for video surveillance.

Technological Background Art

In general, surveillance is the monitoring of behavior, activities, or other changing information for the purpose of influencing, managing, directing, or protecting people. This can include observation from a distance by means of electronic equipment, such as for example closed-circuit television (CCTV) cameras, or interception of electronically transmitted information such as Internet traffic or phone calls. Surveillance, for example, is used by governments for prevention of crime, the protection of a process, person, group or object or the investigation of crime. It is also used by private investigators and private people. Surveillance can be viewed as a violation of privacy, and as such is often opposed by various civil liberties groups and activists. Surveillance cameras are video cameras used for the purpose of observing an area.

Video surveillance becomes more and more popular. Video surveillance is used at public places as well as private places such as offices and homes. The aim of video surveillance is to enhance safety and security. However, the right of privacy very often is disregarded by the application of conventional video surveillance systems.

In the conventional art, there exist several video surveillance systems. For example, there are video surveillance systems continuously operating one or more video cameras recording video images. The adjustments, such as for example angle of view, vertical and horizontal orientation and zoom, once set, remain the same and are not automatically changeable, if at all. In some of the conventional video surveillance systems, a human monitors the video images on a display and may manually adjust the settings of the one or more video cameras. The recorded video images are stored and can be maintained or deleted after a predetermined period of time. In any case, abuse of the image data by unauthorized people may occur.

In other video surveillance systems, the video camera does not operate until a motion sensor indicates motion of a human, an animal or a vehicle. Then, upon detection of motion by the motion sensor, the video camera is turned-on. However, from detection of the motion until the start of operation by the video camera a time delay may result. Hence, the person detected by the motion sensor may have already disappeared and cannot be viewed in the recorded image.

The above mentioned disadvantages provided by the video surveillance systems of the prior art are overcome by the present invention.

Therefore, the objective technical problem underlying the invention is formulated as providing an improved system for video surveillance and a method for video surveillance in a video-surveillance system which allows properly capturing personal data in case of criminal activity, while taking into account the right of privacy in all other cases.

DESCRIPTION OF THE INVENTION

The invention provides a method for video surveillance in a video-surveillance system according to claim 1. Preferred embodiments are defined in the dependent claims.

Claim 1 is directed to a method for video surveillance in a video-surveillance system comprising the steps of capturing video images by a video camera observing an area of surveillance; wherein the capturing the video images comprises making objects in the area of surveillance irrecognizable or invisible in captured video images; receiving, by a processor, a predetermined signal; based on the received predetermined signal, generating a first control signal by the processor and transmitting the first control signal to the video camera; receiving the first control signal by the video camera; based on the received first control signal, stopping making objects in the area of surveillance irrecognizable or invisible in the captured video images.

Video surveillance according to the present invention means observing an area by a video camera. Video surveillance allows for monitoring or recording activity in and around an area of surveillance. The area of surveillance is the area that is observed by the video camera. The area of surveillance can be an indoor area or an outdoor area. For example, the area of surveillance may refer to a passenger area, an inner area of a building, a public place and a private place. A public place may be for example a crossing in a city, a part of a walkway, a town square, or an entrance area at the outside of a building. A private place may be for example an office or any place belonging to a private person such as a flat, a house or a garden occupied by the private person. The area of surveillance, i.e. the area that is observed by the video camera, can be any place that is to be observed.

A video camera is a camera used for electronic motion picture acquisition by digital video capture. The video camera may capture a video image in which a scene, an event or an individual is visible. There are video cameras used for surveillance which are provided in different designs. For example, CCTV generally uses pan tilt zoom cameras (PTZ) which contain mechanical controls that allow the operator to remotely pan (move left and right), tilt (move up and down), and zoom-in or -out the camera either by joystick or software. The PTZ camera, for example, can automatically run patterns or turn to a preset position. Additionally, PTZ cameras can rotate 360 degrees to view an object directly below them. There are further designs and types of video cameras used for surveillance such as, for example, boxstyle camera, dome camera, bullet camera, IP camera, and day/night camera. The boxstyle camera, for example, is comprised of the camera body, lens and power supply. The dome camera, for example, is a half-spherical shaped camera. The bullet camera, for example, has a bullet-like shape. The IP camera, for example, streams its footage over the Internet. The IP camera can be wired or wireless. The day/night camera, for example, has a movable Infrared (IR) filter.

Video cameras can be used in two modes. The first mode is live television, where the camera feeds real time images directly to a screen for immediate observation. In the second mode, the images are recorded to a storage device for archiving or further processing. Recorded video is used in surveillance and monitoring tasks in which unattended recording of a situation is required for later analysis.

Capturing video images means electronic motion picture acquisition by digital video through a video camera. When capturing video images of an area of surveillance by a video camera observing the area of surveillance, there is a certain range that will be displayed on a monitor. An angle of view indicates the displayable range of the image (plane) measured by the angle from the center of the lens to the width of the image in the horizontal, vertical, and diagonal directions. These are called, horizontal angle of view, vertical angle of view and diagonal angle of view, respectively. The wider the angle of view is, the wider the displayable range becomes. The field of view is a measure of how large an area the camera is capable of viewing. The focal length of the lens affects the field of view. Zoom refers to changing a lens's focal length.

Video camera technologies are, for example, WDR (Wide Dynamic Range), DNR (Digital Noise Reduction), Smart IR, and PoE (Power over Ethernet). WDR imaging is a method used to produce video images that try to recreate the full-scene content in scenes that have a dynamic range. DNR technology utilizes temporal noise reduction. The idea is that by blending the frames, the overall noise content in a video image is reduced. Smart IR is used to produce video images at night-time. PoE is a technology designed to deliver power to networking devices using existing data communications cabling.

The video camera observing an area of surveillance, for example, may be mounted at the corner of a building, at the ceiling of a room, or at any position where a video camera can be mounted.

Objects in the area of surveillance may be, for example, individuals and vehicles. However, objects can also be any item, such as, for example, a bag, a backpack or a suitcase.

The step of "making objects in the area of surveillance irrecognizable or invisible in the captured video images" functions as a "privacy filter". No personal data are obtained from objects in the area of surveillance, if the objects are irrecognizable or invisible in the captured video images. In particular, as the objects are not visible and/or recognizable in the captured video images, no personal data of an individual are captured, if one or more of the objects are individuals. Hence, an identification of the individuals is not possible. The right of privacy is preserved although the video camera is operating.

Making objects in the area of surveillance irrecognizable in the captured video images means that a user cannot recognize the objects in the captured video images. For example, the resolution of the video image may be so low that details in the captured image become pixelated. People or vehicles are no longer recognizable in the captured video images, i.e. a person's face or a licence plate number of a vehicle cannot be recognized. Resolution is the measure of noticeable detail that can be seen in a video image. In other words, image resolution is the detail a video image holds. Higher resolution means more image detail.

Making objects in the area of surveillance invisible means, for example, that a user does not detect the objects in the captured video images, since there are no objects captured due to the field of view of the video camera that has been strongly restricted. By observing an area of surveillance and capturing video images in which objects are either irrecognizable or invisible, the right of privacy is protected.

A processor receives a predetermined signal. The predetermined signal may be an alarm signal in the form of an electrical signal, a radio signal, and an optical signal. The predetermined signal received by the processor may have been transmitted from a sensor or input by a user. The processor may determine whether the predetermined signal has been received.

After having received the predetermined signal, the processor generates a first control signal and transmits the first control signal to the video camera. The first control signal can be in the form of an electrical signal, a radio signal, or an optical signal.

The video camera receives the first control signal from the processor. The processor controls the video camera by the first control signal to stop the procedure of making objects in the area of surveillance irrecognizable or invisible in the captured video images. Due to the received first control signal, the video camera, for example, increases resolution of the captured video images and/or enlarges the observed area visible on the captured video images by zooming, i.e. modifying the angle of view of the video camera. The stopping results in captured video images in which the objects are recognizable and visible. For example, a face of a person or a licence plate number of a vehicle can be recognized.

The predetermined signal may be caused by specific situations. For example, the predetermined signal may be triggered by a sensor detecting a fulminating noise or a motion of an object. When the predetermined signal occurs, for example, due to a scene, an event or an individual, that is to be captured by the video camera, the video camera is already operating and does not need time to be turned-on. Hence, a time delay caused by turning on the video camera is avoided such that video images of the scene, the event or the individual that is to be captured by the video camera can be immediately acquired. The scene may be, for example, a market place in a town, which is visited by many people who are to be protected against a terror attack, and where suspicious people or criminals are supposed to currently be there. The event, for example, may be a bank robbery captured by a video camera installed at the ceiling of a service hall of a bank. The individual in the captured video image for example, may be the bank robber or a car thief who just breaks the car open.

According to a development of the present invention, the step of stopping making objects in the area of surveillance irrecognizable or invisible in the captured video images further comprises the step of extending the area of surveillance by using at least one of zooming-in/zooming-out the area of surveillance, horizontally orientating the video camera, and vertically orientating the video camera.

The method according to the invention may be further developed such that the captured video images comprise recognizable objects after stopping making objects in the area of surveillance irrecognizable or invisible in the captured video images.

The objects in the captured video images can be recognized as, for example, individuals, vehicles, buildings and so forth.

The method according the invention may be further developed such that the captured video images comprise image data including personal data. The personal data, preferably, comprise at least one of an individual, a face of an individual, a vehicle, and a license plate number of a vehicle.

Although the video camera is operating, the method acquires personal data not until a predetermined signal occurs. For example, the personal data allow identification of people.

The method may further comprise the steps of starting a timer when the first control signal has been transmitted to the video camera, when the timer elapses, generating a second control signal by the processor, transmitting the second control signal to the video camera, receiving the second control signal by the video camera, and, based on the received second control signal, starting making objects in the area of surveillance irrecognizable or invisible in the captured video images.

A predetermined time period may be set by the timer. The predetermined time period may correspond to the time duration which starts when a situation triggering the predetermined signal occurs and ends when the situation ends.

Alternatively, the generating of the second control signal by the processor may be triggered by an input of a user.

By the second control signal the video camera is controlled by the processor to start the procedure of making objects in the area of surveillance irrecognizable or invisible in the captured video images.

The right of privacy is then preserved by making objects in the captured video images irrecognizable or invisible. If a next situation occurs triggering the predetermined signal, the video camera is immediately operational and no time delay is caused by turning-on the video camera such that the object to be imaged can be viewed in the captured video image.

According to an embodiment of the present invention, the method further comprises the step of storing the captured video images after the step of stopping making objects in the area of surveillance irrecognizable or invisible in the captured video images.

The processor may control the video camera to store the captured video images in a memory. The processor may control the video camera to transmit the captured video images to the processor. The processor may store the captured video images in the memory.

According to a further embodiment of the present invention, the method further comprises the steps of analyzing, by the processor, the captured video images, after having stopped making objects in the area of surveillance irrecognizable or invisible in the captured video images, and identifying at least one object in the analyzed captured video images.

For example, if the face of a person can be recognized in a captured video image, the processor detects the face of the person in the captured video image by using a face recognition method and may try to match the detected face against faces in a database to identify the person. The database may be, for example, a police database, a national database, or an international database. The Internet and its content may also be used as "database".

According to another embodiment of the present invention, the step of making objects in the area of surveillance irrecognizable or invisible in the captured video images further comprises at least one of blurring, pixelation, and narrowing the area of surveillance by using at least one of zooming, horizontally orientating the video camera, and vertically orientating the video camera.

A blur is a shape or an area in a video image which cannot be seen clearly because it has no distinct outline. The edges of the objects in the captured video images are no longer distinct, when the objects in the captured video images are blurred. In image processing, a video image can be blurred, for example, by a Gaussian blur. The Gaussian blur is a type of image-blurring filter that uses a Gaussian function for calculating the transformation to apply to each pixel in the video image. The video image can also be blurred by motion blur which uses a specific video camera setting in order to achieve the blurring.

Pixelation can be achieved by lowering the resolution of a video image. By lowering the resolution of the video image individual pixels become visible, whereas objects in the captured video image are obscured.

Narrowing the area of surveillance means modifying the angle of view of the video camera such that it is zoomed-in to an extent such that merely a small part of the area of surveillance is captured by the video camera excluding any objects. Horizontally orientating the video camera means moving the video camera in the left or right direction. Vertically orientating the video camera means moving the video camera up and down. The modification of the angle of view and the orientating can be controlled by the processor.

According to a further development of the present invention, the step of making objects in the area of surveillance irrecognizable or invisible in the captured video images further comprises temporarily storing the captured video images.

The video camera may comprise a volatile storage for temporarily storing the captured video images. The video camera may also transmit the captured video images to a memory, where the captured video images are stored for a predetermined time period. After expiry of the predetermined time period, the stored video images may be deleted.

According to a further development of the present invention, the processor may receive the predetermined signal from a sensor. The sensor may be, for example, a motion sensor detecting motion of an object in the area of surveillance. The sensor may be, for example, a acoustic sensor detecting ambient noise. The sensor may comprise a motion sensor and a acoustic sensor.

According to another development of the present invention, the processor may receive the predetermined signal from an input by a user.

The sensor may detect at least one of a noise, a sound, an object, and a motion of an object before transmitting the predetermined signal to the processor. For example, the noise may be the noise of an explosion.

The transmission of the first control signal, the second control signal, the predetermined signal, and data of the captured video images is performed via at least one of a wireless local area network (WLAN), a local area network (LAN), a radiocommunication, a serial digital interface (SDI), an Internet Protocol (IP), an analog high definition (AHD), or a power line network.

The present invention also provides a system for video surveillance according to claim 14. Preferred embodiments are defined in the dependent claims.

Claim 14 is directed to a system for video surveillance comprising a video camera configured for observing an area of surveillance and capturing video images, wherein the video camera is further configured for making objects in the area of surveillance irrecognizable or invisible in the captured video images, wherein the video camera is further configured for receiving a first control signal from a processor, based on the received first control signal, stopping making objects in the area of surveillance irrecognizable or invisible in the captured video images, the processor configured for receiving a predetermined signal, based on the received predetermined signal, generating a first control signal and transmitting the first control signal to the video camera, and a sensor configured for generating the predetermined signal and transmitting the predetermined signal to the processor.

The system may comprise a plurality of video cameras. Further, the system may comprise a first memory. The video camera may comprise a second memory. The system may comprise a monitor for displaying captured video images and input means for providing input by a user.

According to a development of the present invention, the video camera is one of a digital video camera and an analog video camera.

The video camera may be rotatable, swiveling, moveable, controllable by software, inclinable, tiltable, usable indoors, and usable outdoors.

Further features and advantages of the present invention will be described in the following with reference to the figures, which illustrate only examples of embodiments of the present invention. The illustrated and described features may be suitably combined with each other.

FIGURES

EMBODIMENTS

The method for video surveillance in a video-surveillance system according to an embodiment of the present invention comprises the steps of capturing video images by a video camera observing an area of surveillance; wherein the capturing the video images comprises making objects in the area of surveillance irrecognizable or invisible in captured video images; receiving, by a processor, a predetermined signal; based on the received predetermined signal, generating a first control signal by the processor and transmitting the first control signal to the video camera; receiving the first control signal by the video camera; based on the received first control signal, stopping making objects in the area of surveillance irrecognizable or invisible in the captured video images.

Figure 1:
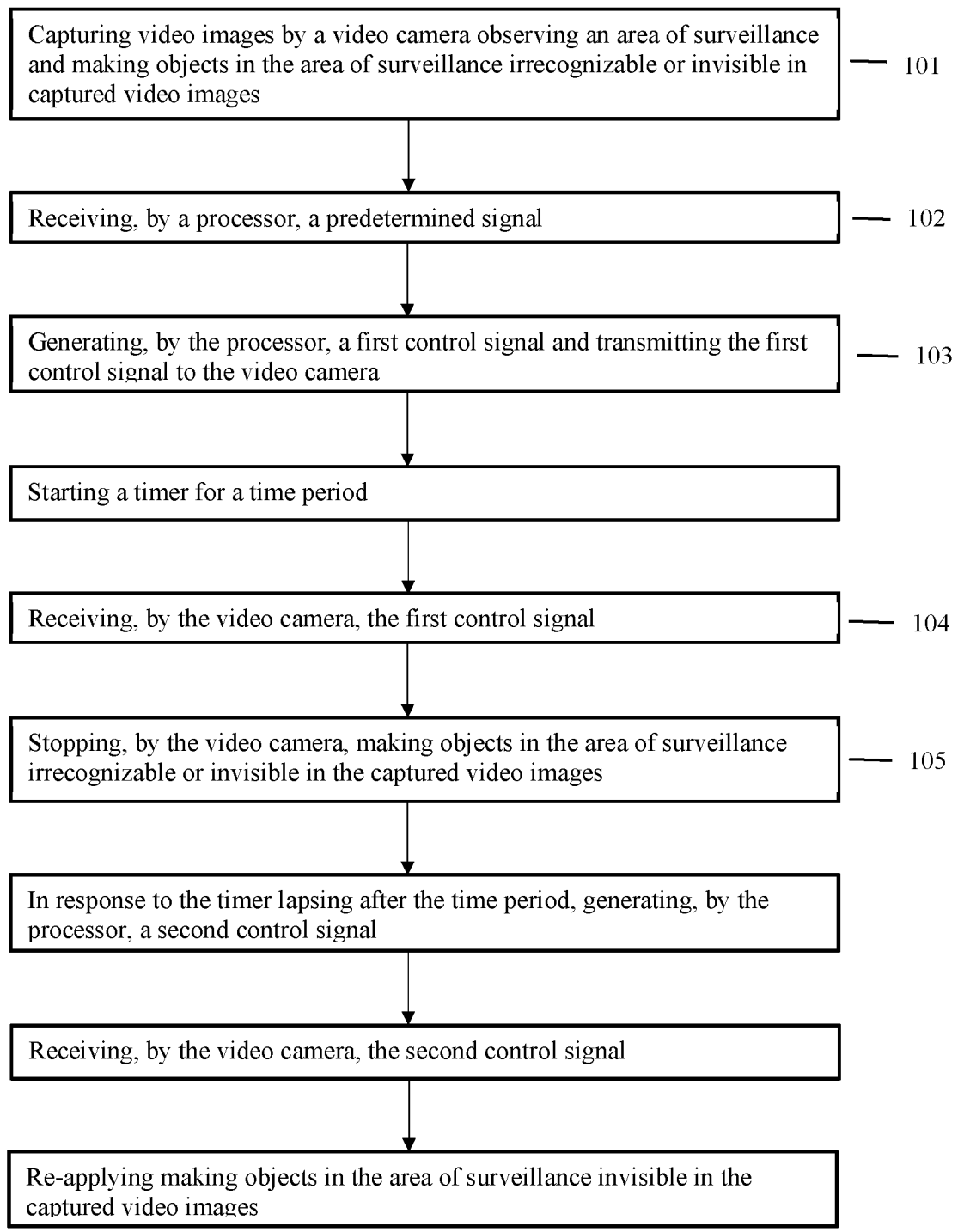
FIG. 1 illustrates a method for video surveillance in a video-surveillance system.

FIG. 1 illustrates a method for video surveillance in a video-surveillance system.

According to a method 100, a video camera observing an area of surveillance captures video images and makes objects in the area of surveillance irrecognizable or invisible in the captured video images in step 101. In step 102, a processor receives a predetermined signal. The predetermined signal may have been transmitted to the processor from a sensor or input by a user. Based on the received predetermined signal, the processor generates a first control signal and transmits the first control signal to the video camera in step 103. The video camera receives the first control signal in step 104. Based on the received first control signal, the video camera stops making objects in the area of surveillance irrecognizable or invisible in the captured video images in step 105.

Additionally, after step 101, the processor may determine whether the predetermined signal has been received, and if it is determined that the predetermined signal is not received by the processor, the method 100 may continue with step 101. If it is determined that the predetermined signal is received by the processor, the method 100 may proceed with steps 103 to 105.

After step 105, a monitor may display clear video images captured by the video camera comprising visible and recognizable objects. Further, the processor may process image data of the captured video images. The processor may analyze the image data and extract personal data of at least one individual. Based on the extracted personal data, the at least one individual may be identified.

The system for video surveillance according to an embodiment of the present invention comprises a video camera configured for observing an area of surveillance and capturing video images, wherein the video camera is further configured for making objects in the area of surveillance irrecognizable or invisible in the captured video images, wherein the video camera is further configured for receiving a first control signal from a processor, based on the received first control signal, stopping making objects in the area of surveillance irrecognizable or invisible in the captured video images; the processor configured for receiving a predetermined signal, based on the received predetermined signal, generating a first control signal and transmitting the first control signal to the video camera; and a sensor configured for generating the predetermined signal and transmitting the predetermined signal to the processor.

Figure 2:
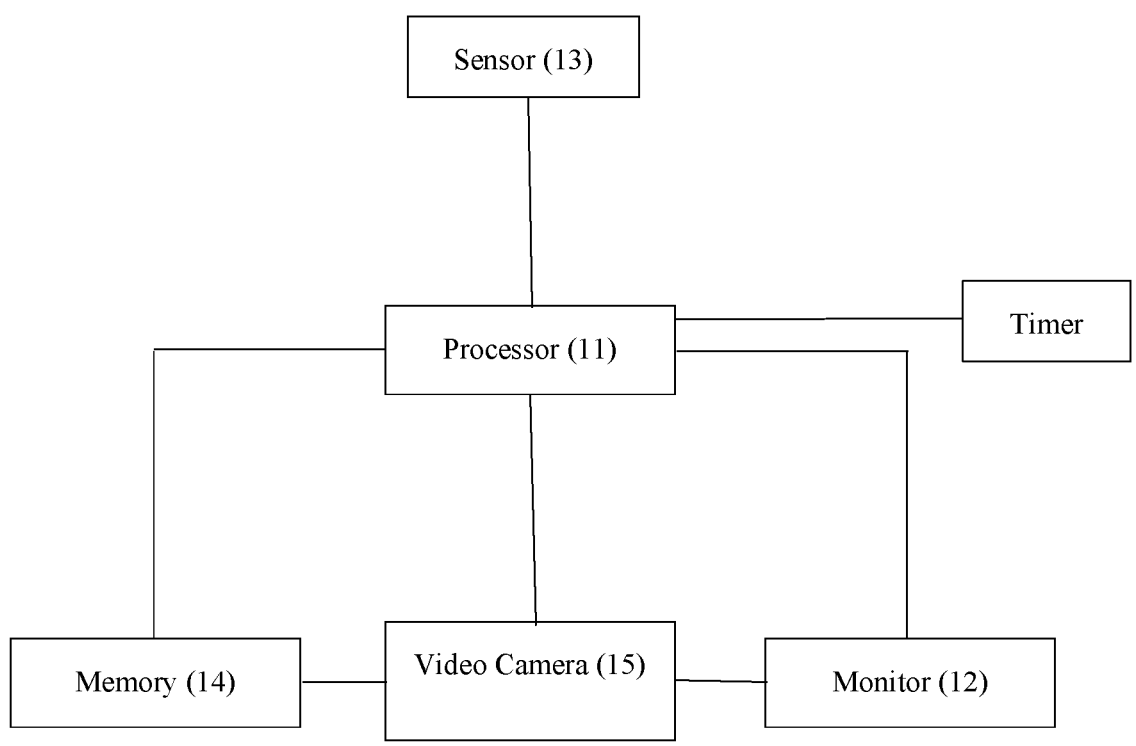
FIG. 2 illustrates a system for video surveillance according to an embodiment of the invention.

FIG. 2 illustrates a system for video surveillance.

In FIG. 2, system 10 comprises a processor 11, a monitor 12, a sensor 13, a memory 14, and a video camera 15. System 10 may comprise a plurality of video cameras 15. In addition to memory 14, system 10 may comprise a further memory. System 10 may comprise input means being configured for receiving an input by a user.

Sensor 13 may be a motion sensor, an acoustic sensor, or a combination of a motion sensor and an acoustic sensor. Sensor 13 may detect a motion, sound and/or noise. For example, the motion of an individual in a closed store may be detected by sensor 13. The individual in the closed store may be a theft. An individual may approach a work of art in a museum and may be detected by sensor 13. Sensor 13 may detect screams of an individual who feels threatened by another individual or who is watching a death-trap. For example, an individual may threaten another individual with a knife. Terrorists may threaten pedestrians at a public place with weapons. Sensor 13 is configured to generate a predetermined signal and transmit the predetermined signal to processor 11. The predetermined signal may be an alarm signal.

Processor 11 is configured to control video camera 15. Video camera 15 may be a digital video camera or an analog video camera. Video camera 15 is configured to observe an area of surveillance and capture video images, wherein video camera 15 makes objects in the area of surveillance irrecognizable or invisible in the captured video images. Video camera 15 is turned-on and operating while making objects in the area of surveillance irrecognizable or invisible in the captured video images. Video camera 15 may be configured to capture video images without capturing personal data. Video camera 15 may use blurring or pixelation for making objects irrecognizable. Video camera 15 may be set to narrow the observed area of surveillance by zooming such that objects are no longer visible. Video camera 15 may be set such that video camera is panned and tilted away from the area of surveillance. The settings may be stored in video camera 15. Not before video camera 15 receives a first control signal from processor 11, video camera 15 stops making objects in the area of surveillance irrecognizable or invisible in the captured video images.

Video camera 15 may operate in two different operating modes. In the first operating mode, video camera 15 may make objects in the area of surveillance irrecognizable or invisible in the captured video images. In the second operating mode, video camera 15 may capture video images without making objects in the area of surveillance irrecognizable or invisible in the captured video images, i.e., video camera 15 may stop making objects in the area of surveillance irrecognizable or invisible in the captured video images.

Processor 11 is configured to receive the predetermined signal from sensor 13, to generate the first control signal and transmit the first control signal to video camera 15. Video camera 15 is configured to receive the first control signal from processor 11. When video camera 15 receives the first control signal from processor 11, video camera 15 is configured to stop making objects in the area of surveillance irrecognizable or invisible in the captured video images. Video camera 15 may be configured to capture video images with capturing personal data.

Monitor 12 may be configured to display the video images captured by video camera 15. Memory 14 may be configured to store the captured video images.

The described embodiments are exemplary and not intended to be limiting. The full scope of the invention is defined in the appended claims.

The invention claimed is:

1. A method for video surveillance in a video-surveillance system, the method comprising the steps of:
   when capturing video images by a video camera being mounted at a location for observing an area of surveillance, operating the video camera by applying:
   (i) at least one selected from a group consisting of blurring the video images in the area of surveillance and pixilating the video images in the area of surveillance, until one or more objects in the area of surveillance are not visible in the captured video images; or
   (ii) at least one selected from a group consisting of zooming-in the area of surveillance until the area of surveillance is narrowed in the captured video images such that one or more objects in the area of surveillance are not visible in the captured video images, and zooming-out the area of surveillance until one or more objects in the area of surveillance are not identifiable in the captured video images; or
   (iii) at least one selected from a group consisting of horizontally orientating the video camera and vertically orientating the video camera until the area of surveillance and one or more objects in the area of surveillance are not visible in the captured video images;
   receiving, by a processor, a predetermined signal;
   in response to receiving the predetermined signal, generating a first control signal by the processor and transmitting the first control signal to the video camera;
   in response to transmitting the first control signal to the video camera, starting a timer for a time period;
   receiving the first control signal by the video camera; and
   in response to receiving the first control signal, operating the video camera by stopping applying (i), (ii) or (iii),
   in response to the timer lapsing after the time period, generating a second control signal by the processor;
   transmitting the second control signal to the video camera;
   receiving the second control signal by the video camera; and
   based on the received second control signal, operating the video camera by re-applying (i), (ii) or (iii),
   wherein the operating the video camera by stopping applying (i), (ii), or (iii) produces captured video images in which the area of surveillance is visible and the one or more objects in the area of surveillance are identifiable.

2. The method of claim 1, wherein the step of operating the video camera by stopping applying (i), (ii) or (iii) further comprises:
   extending the area of surveillance by using at least one selected from the group consisting of zooming-in and zooming-out the area of surveillance, horizontally orientating the video camera, and vertically orientating the video camera.

3. The method of claim 1, wherein, after the step of operating the video camera by stopping applying (i), (ii) or (iii), the captured video images comprise at least one visible object.

4. The method of claim 1, wherein the captured video images comprise image data including personal data, wherein the personal data comprise at least one selected from the group consisting of an individual, a face of an individual, a vehicle, and a license plate number of a vehicle.

5. The method of claim 1, further comprising the step of:
   after the step of operating the video camera by stopping applying (i), (ii) or (iii), storing the captured video images.

6. The method of claim 1, further comprising the steps of:
   after the step of operating the video camera by stopping applying (i), (ii) or (iii), analyzing, by the processor, the captured video images; and
   identifying at least one object in the analyzed captured video images.

7. The method of claim 1, wherein the step of operating the video camera by stopping applying (i), (ii) or (iii) further comprises temporarily storing the captured video images.

8. The method of claim 1, wherein the predetermined signal is received by the processor from a sensor.

9. The method of claim 1, wherein the predetermined signal is received by the processor from an input by a user.

10. The method of claim 8, wherein the sensor detects at least one selected from the group consisting of a noise, a sound, an object, and a motion of an object before transmitting the predetermined signal to the processor.

11. The method of claim 1, wherein transmission of the first control signal, a second control signal, the predetermined signal, and data of the captured video images is performed via at least one selected from the group consisting of a wireless local area network, WLAN, a local area network, LAN, a radiocommunication, a serial digital interface, SDI, an Internet Protocol, IP, an analog high definition, AHD, and a power line network.

12. A system for video surveillance, the system comprising:
    a processor;
    a video camera configured to observe an area of surveillance and to capture video images, wherein, when capturing video images, the video camera is further configured to apply:
    (i) at least one selected from a group consisting of blurring the video images in the area of surveillance and pixilating the video images in the area of surveillance, until one or more objects in the area of surveillance are not visible in the captured video images; or
    (ii) at least one selected from a group consisting of zooming-in the area of surveillance until the area of surveillance is narrowed in the captured video images such that one or more objects in the area of surveillance are not visible in the captured video images, and zooming-out the area of surveillance until one or more objects in the area of surveillance are not identifiable in the captured video images; or
    (iii) at least one selected from a group consisting of horizontally orientating the video camera and vertically orientating the video camera until the area of surveillance and one or more objects in the area of surveillance are not visible in the captured video images;
    a sensor configured to generate a predetermined signal and to transmit the predetermined signal to the processor,
    wherein the processor is configured to:
    in response to receiving the predetermined signal, generate a first control signal,
    transmit the first control signal to the video camera, in response to transmitting the first control signal, start a timer for a time period, in response to the timer lapsing after the time period, generate a second control signal, and transmit the second control signal to the video camera, wherein the video camera is further configured to:

in response to receiving the first control signal, stop applying (i), (ii) or (iii), and in response to receiving the second control signal, operating the video camera by re-applying (i), (ii) or (iii).

13. The system of claim 12, wherein the video camera is one of a digital video camera and an analog video camera.

14. The method of claim 2, wherein, after the step of operating the video camera by stopping applying (i), (ii) or (iii), the captured video images comprise at least one visible object.

15. The method of claim 2, wherein the captured video images comprise image data including personal data, wherein the personal data comprise at least one selected from the group consisting of an individual, a face of an individual, a vehicle, and a license plate number of a vehicle.

16. The method of claim 3, wherein the captured video images comprise image data including personal data, wherein the personal data comprise at least one selected from the group consisting of an individual, a face of an individual, a vehicle, and a license plate number of a vehicle.

17. The method of claim 1, wherein the one or more objects in the area of surveillance are at least one selected from a group consisting of an individual and a vehicle.

* * * * *